US012595216B2

(12) United States Patent
Mehr et al.

(10) Patent No.: US 12,595,216 B2
(45) Date of Patent: Apr. 7, 2026

(54) METAL CARBIDE INFILTRATED C/C COMPOSITES

(71) Applicant: Honeywell International Inc., Charlotte, NC (US)

(72) Inventors: Mehrad Mehr, Raleigh, NC (US); Bahram Jadidian, Watchung, NJ (US)

(73) Assignee: Honeywell International Inc., Charlotte, NC (US)

( * ) Notice: Subject to any disclaimer, the term of this patent is extended or adjusted under 35 U.S.C. 154(b) by 310 days.

(21) Appl. No.: 18/302,653

(22) Filed: Apr. 18, 2023

(65) Prior Publication Data

US 2024/0351958 A1 Oct. 24, 2024

(51) Int. Cl.
| | |
|---|---|
| *C04B 41/45* | (2006.01) |
| *C04B 35/83* | (2006.01) |
| *C04B 38/00* | (2006.01) |
| *C04B 41/50* | (2006.01) |
| *C04B 41/87* | (2006.01) |

(52) U.S. Cl.
CPC .......... *C04B 41/4556* (2013.01); *C04B 35/83* (2013.01); *C04B 38/0058* (2013.01); *C04B 38/0067* (2013.01); *C04B 41/5059* (2013.01); *C04B 41/5061* (2013.01); *C04B 41/87* (2013.01); *C04B 2235/422* (2013.01); *C04B 2235/5248* (2013.01)

(58) Field of Classification Search
CPC .... C04B 2235/3817; C04B 2235/3826; C04B 2235/3839; C04B 2235/3843; C04B 2235/422; C04B 2235/5248; C04B 2235/616; C04B 35/573; C04B 35/83; C04B 38/0058; C04B 38/0067; C04B 41/4556; C04B 41/457; C04B 41/5057; C04B 41/5059; C04B 41/5061; C04B 41/51; C04B 41/87
See application file for complete search history.

(56) References Cited

U.S. PATENT DOCUMENTS

| | | | |
|---|---|---|---|
| 3,493,423 A | 2/1970 | Hartwig | |
| 6,221,475 B1 * | 4/2001 | Domergue | ............ C04B 35/573 |
| | | | 523/156 |
| 6,555,173 B1 | 4/2003 | Forsythe et al. | |
| 8,563,124 B2 | 10/2013 | Chmelka et al. | |

(Continued)

FOREIGN PATENT DOCUMENTS

| | | |
|---|---|---|
| CN | 102718540 A | 10/2012 |
| EP | 2871173 B1 | 9/2019 |

(Continued)

OTHER PUBLICATIONS

Extended Search Report from counterpart European Application No. 24166062.0 dated Sep. 23, 2024, 8 pp.

(Continued)

*Primary Examiner* — Hai Vo

(74) *Attorney, Agent, or Firm* — Shumaker & Sieffert, P.A.

(57) ABSTRACT

An article includes a substrate. The substrate includes at least two phases. The first phase includes a carbon-carbon (C/C) composite. The second phase includes a metal carbide. The second phase is disposed within a plurality of interconnected pores of the first phase, wherein the second phase extends from a surface of the substrate to a depth of at least 300 micrometers below the surface of the substrate.

19 Claims, 5 Drawing Sheets

(56)                References Cited

U.S. PATENT DOCUMENTS

| | | | |
|---|---|---|---|
| 10,294,163 B2 | 5/2019 | Koga et al. | |
| 2004/0033341 A1* | 2/2004 | Lam | F16D 69/026 |
| | | | 428/143 |
| 2020/0331816 A1 | 10/2020 | Guercio et al. | |
| 2022/0170150 A1 | 6/2022 | Jo | |
| 2022/0388917 A1* | 12/2022 | Jadidian | C04B 41/4558 |

FOREIGN PATENT DOCUMENTS

| | | |
|---|---|---|
| EP | 4098640 A1 | 12/2022 |
| JP | H06279154 A | 10/1994 |
| RU | 2622061 C1 | 6/2017 |

OTHER PUBLICATIONS

Response to Extended Search Report dated Sep. 23, 2024, from counterpart European Application No. 24166062.0 filed Dec. 12, 2024, 9 pp.

\* cited by examiner

200

INFITLRATE A SUBSTRATE WITH A FLUID THAT INCLUDES A METAL, WHEREIN THE SUBSTRATE INCLUDES A FIRST PHASE INCLUDING A C/C COMPOSITE
202

REACTING CARBON OF THE FIRST PHASE WITH THE METAL TO FORM A SECOND PHASE DISPOSED WITHIN INTERCONNECTED PORES OF THE FIRST PHASE
204

METAL CARBIDE INFILTRATED C/C COMPOSITES

TECHNICAL FIELD

The disclosure relates to ceramic matrix composites.

BACKGROUND

Carbon-carbon (C/C) composites may be used in high temperature applications. For example, the aerospace industry employs C/C composite components as friction materials for commercial and military aircraft, such as brake friction materials. Applications of C/C composites also include hypersonic materials, locomotive brakes, space vehicle structural components, and more. In high temperature applications, C/C composites may be susceptible to oxidation, which may lead to deterioration of physio-mechanical properties and/or recession of portions of a component.

SUMMARY

Almost all C/C composites define an internal porosity as a result of manufacturing processes, such as voids created by trapped air or volatile gases released during curing. The internal porosity may accelerate oxidation of the C/C composite by increasing an exposed surface area of the C/C composite on which oxidation reactions may occur. Oxidation of a C/C composite may lead to recession, where portions of the C/C composite are compromised or break away from the component bulk. In general, the disclosure describes articles and techniques for forming articles that include a second phase of metal carbide disposed on surfaces on and within a substrate that includes a first phase of carbon-carbon composite (C/C). Rather than merely coating exterior surfaces of the C/C composite, the second phase is disposed on interior surfaces within interconnected pores of the first phase, infiltrating to a depth below the surface of the substrate to fill at least some of the interconnected pores, which may reduce or eliminate oxidation and ultimate recession of portions of the first phase.

In some examples, the disclosure is directed to articles which include a substrate comprising at least two phases. The first phase includes a carbon-carbon (C/C) composite. The second phase includes a metal carbide. The second phase is disposed within a plurality of interconnected pores of the first phase, extending from a surface of the substrate to a depth below the surface of the substrate. In some examples, the depth may be at least about 300 micrometers, or at least about 500 micrometers, or at least about 1,000 micrometers below the surface of the substrate.

In some examples, the disclosure is directed to techniques which include infiltrating interconnected pores of a substrate with a fluid that comprises a metal. The substrate includes a first phase, which includes a C/C composite. A plurality of interconnected pores are disposed within the first phase. The technique also includes reacting carbon of the first phase with the metal to form a second phase which includes silicon carbide. The second phase is disposed within the interconnected pores of the first phase. In some examples, the second phase may extend to a depth below a surface of the substrate. The depth may be at least about 300 micrometers, or at least about 500 micrometers, or at least about 1,000 micrometers below the surface of the substrate.

The details of one or more examples are set forth in the accompanying drawings and the description below, where like symbols indicate like elements. Other features, objects, and advantages will be apparent from the description and drawings, and from the claims.

DETAILED DESCRIPTION

Figure 1:
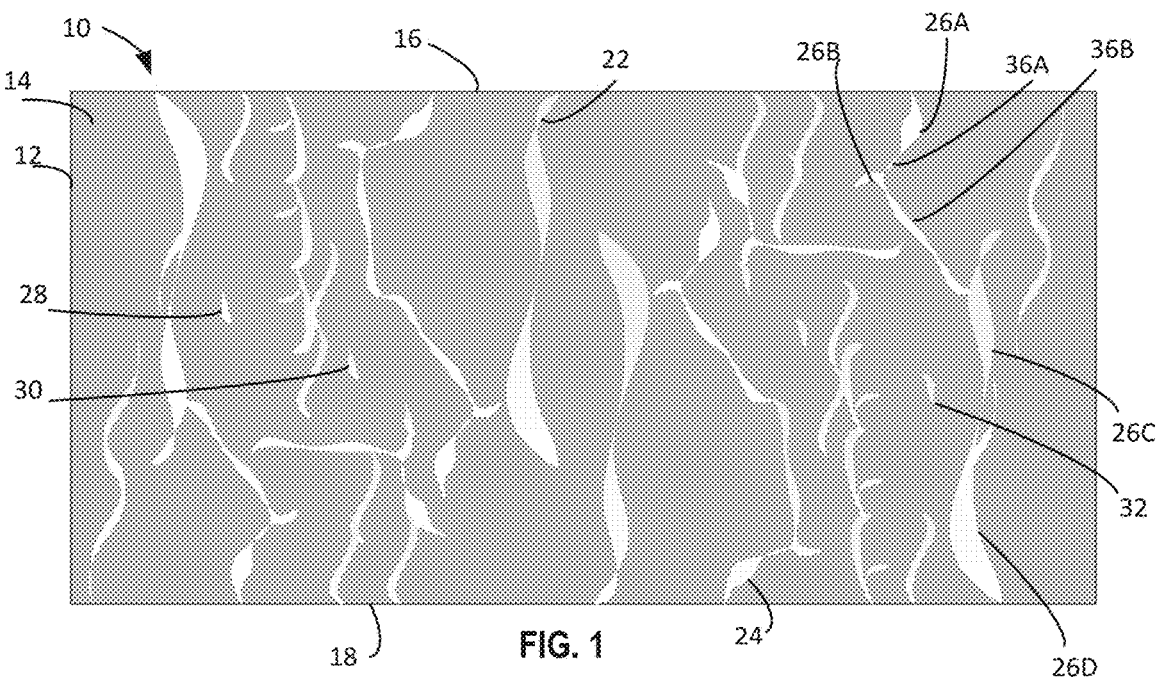
FIG. 1 is a schematic cross-sectional view of a portion of an example first phase of an article, according to one or more examples of the disclosure.

Carbon-carbon (C/C) composite components may provide good mechanical properties and have low mass density relative to other materials, such as metal alloys. However, at high temperatures, carbon-carbon composite components may be susceptible to oxidation, environmental attack, and degradation of physio-mechanical properties. Antioxidant coatings may improve resistance to oxidation and/or environmental attack at high temperatures experienced in aerospace applications, such as aircraft brakes (e.g., temperatures as high as 1600° C.), locomotive brakes, space vehicle structural components, and hypersonic applications, such as leading edges and rocket nozzles.

Some C/C composites may define pores of void volume within the composite. The pores may be open (e.g., fluidically connected to a surface of the C/C composite component) or closed (e.g., not fluidically connected to a surface of the component). In some examples, C/C composite components with an open porosity may include a plurality of interconnected pores that fluidically connect void volumes deep within (e.g., relatively far from a surface of) the C/C composite to a surface of the composite. The internal porosity of a C/C composite, such as whether the porosity is open or closed, functionally graded in one or more directions, or the like, may be the subject of design choices and/or requirements of the C/C composite. Generally, the porosity may be correlated with interlaminar ply spaces within the C/C composite. For example, the porosity may include horizontal pores that form in interlaminar ply spaces between layers of plies and vertical pores that form in interlaminar ply spaces within layers of plies.

Conventional antioxidant coatings may only form an antioxidant layer at or near the surface of the component. At a beginning of service life of the component, such an antioxidant coating may remain intact to sufficiently seal the component. However, after a period of use, a portion of a surface coating layer positioned over a plurality of interconnected pores in a component with open porosity may be lost through recession or spallation, such as by an impact. The compromised coating layer may expose portions of the C/C composite that are deep within the composite to oxidation through the plurality of interconnected pores, which may lead to deterioration of physio-mechanical properties and/or recession of portions of a component.

The disclosure describes carbon-carbon (C/C) composite articles that include a first, primary phase of a C/C composite substrate and a second phase of a metal carbide disposed within interconnected pores of the C/C composite. The disclosed articles may be suitable for ultra-high temperature (e.g., greater than 1500 degrees Celsius (° C.)) applications, which may improve the performance of the C/C composite relative to a C/C composite without the second phase in applications including automotive brakes, locomotive brakes, space vehicle structural components, and hypersonic applications. Further, such articles may continue to be protected, even after minor damage to a surface portion of the metal carbide, which may otherwise have exposed internal surfaces to oxidation without disposition within the interconnected pores.

Prior to use in an oxidizing atmosphere, techniques according to the present disclosure may be executed to improve oxidation resistance of the C/C component. First, during an infiltration step, interconnected pores of the C/C composite substrate may be infiltrated with a fluid that includes one or more metals. Suitable metals include silicon (Si), hafnium (Hf), molybdenum (Mo), tungsten (W), or the like. Next, during a reaction step, the metal may react with carbon on interior and exterior surfaces of the C/C composite to form a second phase which includes metal carbide disposed within the first phase, which is the C/C composite. The second phase may continue to form until the interconnected pores are filled. The second phase may act as a barrier, blocking oxidizing agents encountered in service from migrating along interconnected pores of the C/C composite component to oxidize portions of the exposed surface area buried within the C/C composite. Thus, the second phase may increase the useable life of the component.

In some examples, the metal may be entrained in a liquid metal slurry. The metal slurry may include particles of the metal and one or more carrier materials, or may consist essentially of pure metal in a molten state. In either case, the metal slurry may be applied (e.g., by brushing, spraying, immersion, or the like) on one or more surfaces of the C/C composite substrate, such as a first surface and a second opposite surface. In some examples, application and/or infiltration of the metal may be conducted while heating or maintaining the heat of the metal slurry above a threshold temperature, such that the metal may wick by capillary action along a fluid path of interconnected pores in the C/C composite substrate before reacting with carbon of the C/C composite substrate. Alternatively, in some examples, the infiltration step may be executed while the metal is in a gaseous state, such as during a chemical vapor deposition/chemical vapor infiltration (CVD/CVI) process.

In some examples, the C/C composite component may define both open pores and closed pores. The open pores and closed pores may together define a substrate porosity, which may be less than or equal to about 30 percent of the total volume of the C/C composite substrate, such as between about 2 percent and about 20 percent of the total volume of the substrate, or about 5 percent and about 15 percent of the total volume of the substrate. About, as defined herein, may include the stated value as well as those values within 10 percent, or within 20 percent, or within 30 percent of the stated value. Inclusion of a second phase of metal carbide in C/C composites which define open pores may advantageously reduce the recession rate of a composite component that would, in the absence of the second phase, be susceptible to oxidation. Similarly, inclusion of the second phase in components where the substrate porosity is within the stated substrate porosity ranges may similarly reduce the recession rate of a composite component that would, in the absence of the second phase, be susceptible to oxidation due to the increased surface area for oxidation introduced by the pores. The plurality of closed pores defined by the C/C composite component substrate, which may not be fluidically connected to a surface of the substrate, may not be filled by the second phase, thus defining empty void volumes in the substrate that may not substantially be exposed to oxidation. In some examples, the total volume defined by the plurality of closed pores may be less than or equal to about ten percent of the total volume of the substrate.

In some examples, the second phase may substantially fill one or more interconnected pores of the component. For example, a first individual pore of the plurality of interconnected pores of the first phase may define a dimension that is less than about 40 micrometers in one dimension. The second phase may substantially fill the first pore, such that migration of oxidizing species through the first pore may be substantially reduced. A pore that is substantially filled may mean that greater than 90 percent of the volume of the pore is occupied by the second phase. In some examples, individual pores that do not define a dimension that is less than about 40 micrometers in at least one direction may not be filled by the second phase, because the reaction of the metal of the infiltrated fluid with carbon of the C/C composite component may be diffusion limited, resulting in a void space or a space within a pore filled by unreacted metal, which may subsequently react with oxygen and create a volume change. With the interconnected pores of the C/C composite substrate filled as such by the second phase, the C/C composite may be less susceptible to oxidation and/or recession.

In some examples, articles according to the present disclosure may further include a layer of the second phase disposed on a surface of the substrate. The layer may be about 1 micrometer to about 30 micrometers thick. Since the second phase is configured to protect the C/C composite from oxidation both when disposed in interconnected pores of the first phase and as a coating formed as a layer on the first phase, articles which include a layer of the second phase disposed on a surface of the substrate may both reduce or eliminate recession of the C/C composite and reduce manufacturing complexity.

In some examples, the second phase may be distributed substantially evenly throughout the first phase across a depth of the substrate. For example, the C/C composite component may define a first surface and a second surface opposite the first surface. The second phase may be distributed substantially evenly from the first surface to the second surface, filling each pore of the interconnected pores to the same or nearly the same degree. Compared to articles formed with conventional coating or infiltration techniques, the described articles may be more uniform, which may be beneficial for more even weight distribution, more uniform resistance to oxidation, or the like.

FIG. 1 is a schematic cross-sectional view of a portion of an example substrate 12 including a first phase 14 of an article 10, according to one or more examples of the disclosure. The illustrated portion of article 10 may be a portion of a high-temperature aerospace, automotive, or locomotive component, such as a hypersonic leading-edge component.

Substrate 12 of article 10 includes a carbon/carbon (C/C) composite first phase 14. First phase 14 may include carbon-based reinforcement fibers and a carbon-based matrix material at least partially surrounding the carbon-based reinforcement fibers. In some examples, first phase 14 may be formed form a porous preform that includes carbon fibers or carbon-precursor fibers. Examples of porous preforms that may be used to produce first phase 14 include, but are not limited to: a fibrous preform, such as a woven fiber preform, a nonwoven fiber preform, a chopped-fiber and binder preform, a binder-treated random fiber preform, a carbon fiber preform, or a ceramic fiber preform; a foam preform; a porous carbon body preform; or a porous ceramic body preforms.

In some examples, the porous preform includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In some examples, the layers include one or more tow layers, one or more web layers, or combinations thereof. Tow layers may include one or more tows of fibers. Tows of fibers may be arranged in any suitable arrangement including, for example, linear, radial, chordal, or the like. Web layers may include web fibers, which may include relatively short, chopped, and entangled fibers of fibers. In other examples, the porous preform may not include predefined layers, but, rather, may be formed from a bundle of fibers that are mechanically bound together, e.g., via needling. In other examples, a combination of any of the aforementioned types of porous preforms can be used.

First phase 14 may also include a matrix material that at least partially encapsulates the carbon fibers. The matrix material may be introduced into the porous preform using one or more of a variety of techniques, including, for example, chemical vapor deposition/chemical vapor infiltration (CVD/CVI), resin transfer molding (RTM), vacuum/pressure infiltration (VPI), high pressure impregnation/carbonization (PIC), or the like.

First phase 14 may define a first surface 16 and a second, opposite surface 18. A depth dimension of substrate 12 may be defined as the distance between first surface 16 and second surface 18. In some examples, the depth dimension may be at least about 200 micrometers, such as at least about 500 micrometers.

Substrate 12 may define a substrate porosity, which may be the relative volume within substrate 12 that is not occupied by first phase 14, such as may be occupied by air or other gaseous species prior to formation of a second phase described below. The substrate porosity may be the result of the way the carbon-based reinforcement fibers and carbon-based matrix material are formed to create the porous preform. For example, the substrate porosity may be correlated with interlaminar ply spaces between the carbon-based reinforcement fibers of first phase 14. During fabrication, these interlaminar ply spaces may trap air and/or release volatile gases that occupy voids and define the substrate porosity. The substrate porosity be less than or equal to about 30 percent of the total volume of substrate 12.

The substrate porosity of substrate 12 may include a plurality of open pores 22, 24, 26 and closed pores 28, 30, 32. Open pores 22, 24, 26 may include any voids that are fluidically connected to the exterior surface of substrate 12. Closed pores 28, 30, 32 may include any voids that are not fluidically connected to the surface of substrate 12. In some examples, the total empty void volume defined by the plurality of closed pores 28, 30, 32 may include less than about ten percent of the total volume of substrate 12. In some examples, as illustrated, the open pores 22, 24, 26 and/or closed pores 28, 30, 32 may be irregular in shape and irregular in pattern. Alternatively, in some examples, open pores 22, 24, 26 and/or closed pores 28, 30, 32 may be define a substantially uniform pattern of shape, size, or position within first phase 14. For example, pores 22, 24, 26, 28, 30, 32 that are formed due to a particular underlying structure of substrate 12 may exhibit a regular pattern corresponding to the underlying structure.

In some examples, open pores of substrate 12 may include one or more individual pores. For example, open pore 26 may be made up of individual pores 26A, 26B, 26C. 26D (collectively, "open pore 26"). Pores 26A-26D may be interconnected (e.g., fluidically connected) to form open pore 26. For example, first pore 26A may be fluidically connected to second pore 26B by flow path 36A, second pore 26B may be fluidically connected to third pore 26C by flow path 36B, and the like, with other flow paths not labelled for clarity. Each individual pore 26A-26D may define a general direction or shape, such that open pore 26 may have a series of directions or shapes.

In some examples, open pores of substrate 12 may extend into substrate 12, such that portions of substrate 12 may be fluidically connected to first surface 16 of substrate 12. For example, open pore 26 may extend a depth into substrate 12 in a direction substantially perpendicular to surface 16. In some examples, the depth may be at least 300 micrometers, or at least 500 micrometers, or at least 1,000 micrometers below surface 16 of substrate 12. In some examples, the depth of open pore 26 may extend from first surface 16 to second surface 18, fluidically connecting surface 16 to surface 18.

Article 10 may be subject to high temperatures in an oxidizing atmosphere during operation. As one example, carbon-carbon composite brake discs may be subject to temperatures as high as about 3,000 degrees Fahrenheit (° F.) (about 1,649° C.) during braking events. In the example of FIG. 1, without further protection, oxidizing species may migrate through open pores 22, 24, 26 and react with surfaces of first phase 14 to degrade substrate 12.

Figure 2:
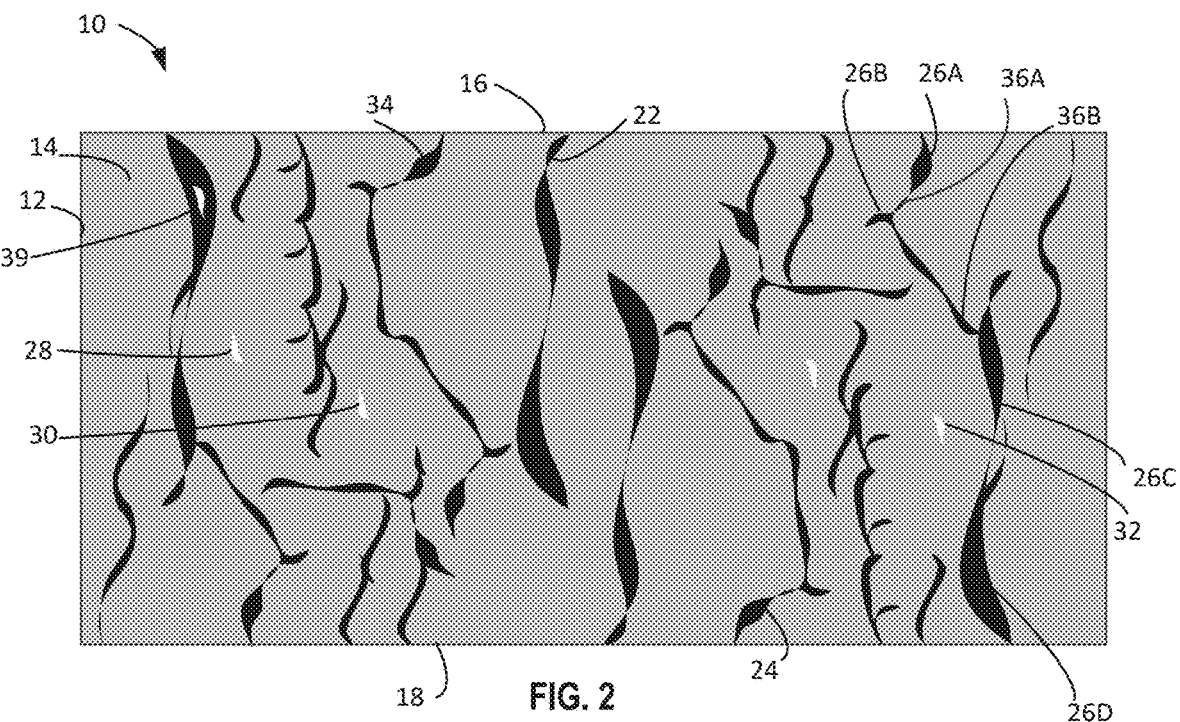
FIG. 2 is a schematic cross-sectional view illustrating the portion of the example article of FIG. 1 with a second phase disposed within interconnected pores of the first phase.

Referring to FIG. 2, to protect substrate 12 from oxidation, article 10 may include second phase 34 disposed within open pores 22, 24, 26. Second phase 34 includes a metal carbide. Metal carbides may have high strength, wear-resistance, temperature resistance, and may be chemically compatible with first phase 14. The metal carbide of second phase 34 may include any metal carbide capable of being formed in situ between reactive carbon on interior surfaces of open pores 22, 24, 26 and a metal infiltrated into open pores 22, 24, 26 by via a fluid, such as a metal slurry or a metal in a gaseous state. In some examples, the metal carbide includes at least one of silicon carbide, titanium carbide, hafnium carbide, molybdenum carbide, or tungsten carbide, which may provide for further improvements to one or more properties of second phase 34, such as the oxidation resistance.

In some examples, as illustrated, second phase 34 may be substantially evenly distributed throughout first phase 14 along a depth of substrate 12. For example, while open pores 22, 24, 26 may have a relatively random distribution, due to interconnections between open pores 22, 24, 26 that form an interconnected network, second phase 34 may distributed relatively evenly within substrate 12. In some examples, as illustrated, second phase 34 may be disposed in and substantially fill open pore 26 from first surface 16 to second surface 18. However, alternatively, in some examples, second phase 34 may not extend all the way to second surface 18. Rather, second phase 34 may extend from first surface 16 to a depth of at least about 300 micrometers, or at least about 500 micrometers, or at least about 1,000 micrometers below the surface of the substrate, when measured along a line perpendicular from first surface 16 toward second surface 18. Inclusion of second phase 34 that extends to at least 300 micrometers below a surface of the component may ensure that damage at a surface layer of the component does not allow oxidizing agents (e.g., oxygen) encountered in service to travel through interconnected pores 26A-26D to oxidize other portions of first phase 14. In this way, inspection and repair of article 10 may be limited to focus on portions where a surface coating layer is damaged. In some example a cut-away slice of substrate 12 at a depth of 300 micrometers, or 500 micrometers, or 1,000 micrometers may include a similar amount (e.g., the same amount or nearly the same amount) of second phase 34 as a cut away slice of substrate 12 at a depth of 10 or 20 micrometers. In this way, second phase 34 may be substantially evenly distributed through a depth of substrate 12.

In some examples, second phase 34 may substantially fill one or more interconnected pores 26A-26D of first phase 14. For example, individual pore 26A of open pore 26 the first phase may define a dimension that is less than about 40 micrometers in one dimension (e.g., a width, in a direction parallel to surface 16 of FIG. 2). In some examples, second phase 34 may substantially fill first pore 26A. A pore that is substantially filled may mean that greater than 90 percent of the volume of pore 26A is occupied by second phase 34.

In some examples, second phase 34 may substantially fill a portion of an open pore, such that the open pore may be substantially sealed without filling the entire open pore. For example, an open pore may be characterized by relatively wide portions, such as individual pores, and relatively narrow portions, such as flow paths between pores. Some relatively large individual pores may not be completely filled due to relatively large volume of the individual pore compared with other pores. For example, individual pores that do not define a dimension that is less than about 40 micrometers in at least one direction may not be filled by the second phase, because the reaction of the metal of the infiltrated fluid with carbon of the C/C composite component may be diffusion limited, resulting in a void space or a space within a pore filled by unreacted metal, which may subsequently react with oxygen and create a volume change. In the example of FIG. 2, closed pore 39 may represent a portion of an open pore that may not be filled with second phase 12, but that may be substantially sealed due to filling of adjacent portions of the open pore.

Although not necessary, because conversion of reactive carbon of first phase 14 is typically sufficient to provide second phase 34 which substantially fills first pore 26A, in some examples reactive carbon may be added to open pore 26A and used to react with metal of an infiltrated metal to form second phase 34 which includes metal carbide.

In some examples, second phase 34 may be stable at temperatures of up to about 3600° F. (about 2000° C.). In this context, "stable" may mean that second phase 34 do not degrade into their constituent elements, do not react with carbon, and/or do not react with other elements or compounds present in the environment in which second phase 34 are used including, but not limited to, oxidation, for a period of time (e.g., minutes or hours).

In some examples, as illustrated, closed pores 28, 30, 32 do not fluidically connect to surface 16 or surface 18 of substrate 12. As such, closed pores 28, 30, 32 may not be infiltrated by the metal, and thus closed pores 28, 30, 32 may define empty void volumes in substrate 12. The total volume of all closed pores 28, 30, 32 may, in some examples, define a volume that is less than 10 percent of the entire volume of substrate 12. As such, by forming second phase 14 in a similar manner as oxidizing species would otherwise infiltrate substrate 12, second phase 14 may seal only those portions of substrate 12 that are susceptible to oxidation.

Figure 3:
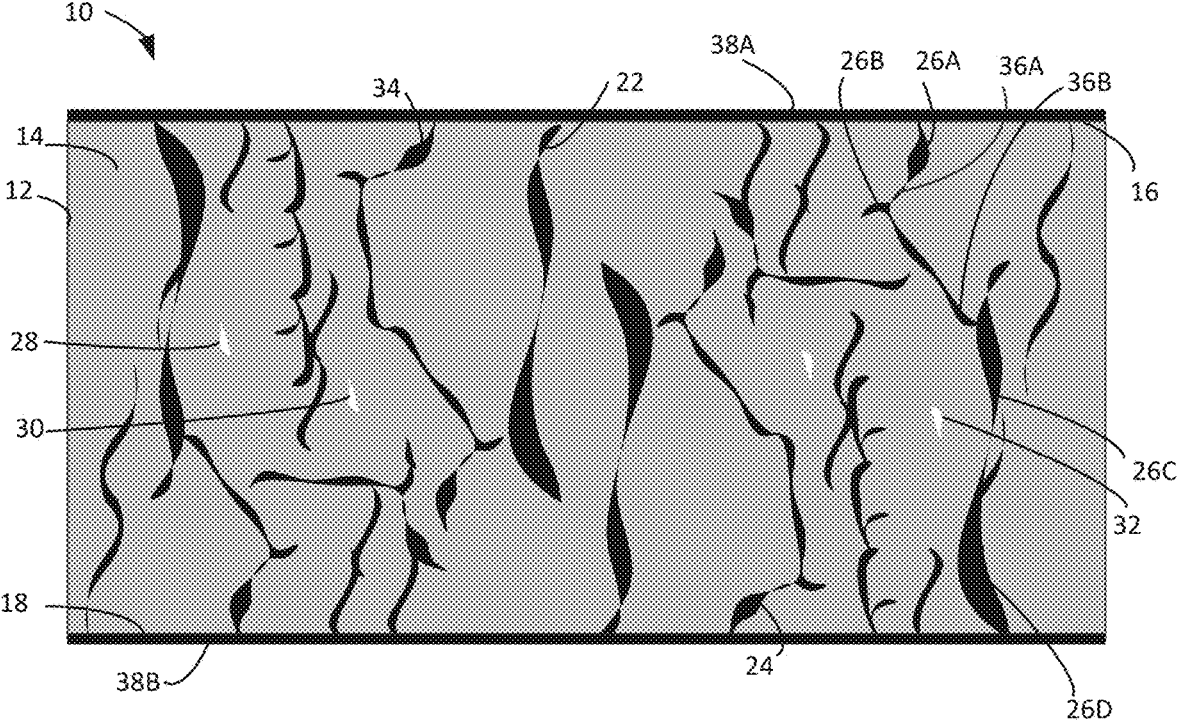
FIG. 3 is schematic cross-sectional view of the portion of the article of FIG. 2 with a layer of the second phase disposed on surfaces of the substrate.

FIG. 3 is schematic cross-sectional view of the portion of the article of FIG. 2 with layer 38A of second phase 34 disposed on first surface 16 of substrate 12 and layer 38B of second phase 34 disposed on second surface 18. Although illustrated on both surface 16 and surface 18, in some examples only one of layers 38A, 38B (collectively, "layers 38") may be included. For instance, only one of layers 38 may be included when the technique for forming article 10 only includes infiltrating article 10 from one side. Article 10 of FIG. 3 may otherwise be described similarly to article 10 of FIGS. 1 and 2.

Layers 38 may be stable at temperatures of up to about 3600° F. (about 2000° C.). In this context, "stable" may mean that layers 38 do not degrade into their constituent elements, do not react with carbon, and/or do not react with other elements or compounds present in the environment in which layers 38 are used including, but not limited to, oxidation, for a period of time (e.g., minutes or hours). Layers 38 may have any suitable thickness. In some examples, a thickness of coating 38 may be between about 1 micrometer and about 30 micrometers. In some examples, a thickness of layers 38 may be self-terminating and determined by diffusion properties of the metal carbon system.

Figure 4:
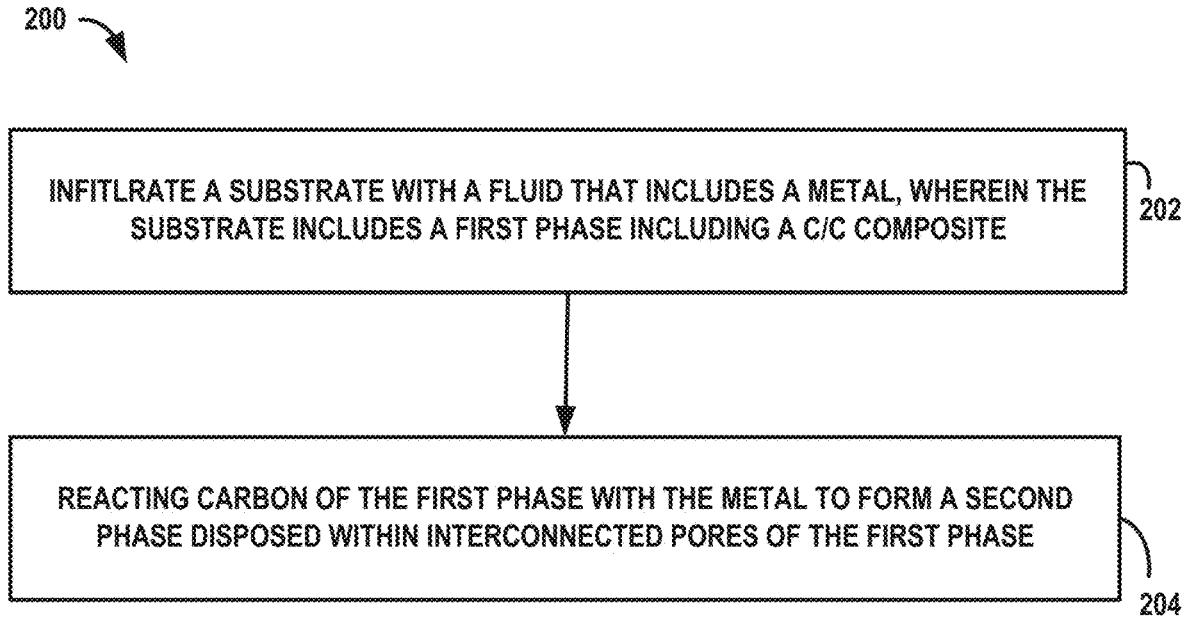
FIG. 4 is a flow diagram illustrating an example technique for forming an article according to the present disclosure.

FIG. 4 is a flow diagram illustrating an example technique 200 for forming an article according to the present disclosure. Although described primarily with respect to forming article 10 of FIGS. 1-3, technique 200 may be used to form other articles, and article 10 may be formed by other techniques. Technique 200 of FIG. 4 is described with concurrent reference to system 300 of FIG. 5, which may be a system or series of systems suitable for forming article 10.

Technique 200 includes infiltrating substrate 12 with a fluid that includes a metal, wherein the substrate includes first phase 14 which includes a C/C composite (202). FIG. 1 is a cross-sectional side view diagram illustrating a portion of first phase 14 of C/C composite substrate 12 prior to infiltration. Prior to infiltration step 202, closed pores 28, 30, 32 and open pores 22, 24, and 26 may be empty void volumes within substrate, together defining a substrate porosity.

Figure 5:
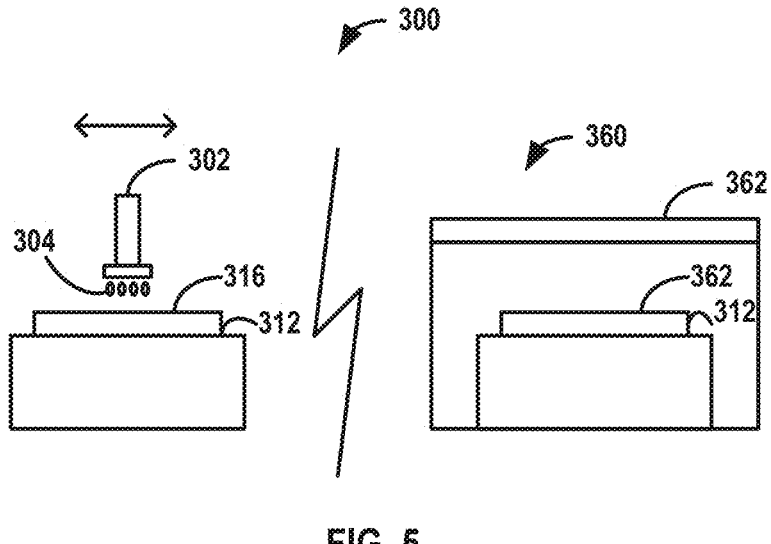
FIG. 5 is a schematic diagram illustrating a system for forming articles according to one or more examples the present disclosure.

Referring to FIG. 5, system 300 may include metal application system 302. Metal application system 302 may be configured to apply fluid in the form of a liquid metal slurry 304 to surface 316 of substrate 312. Although not illustrated in FIG. 5, in some examples metal application system 302 may be further configured to apply metal to a second opposite surface (18, FIGS. 1-3). While illustrated in FIG. 5 as spray system applying metal slurry 304, metal application system 302 may include any system configured to apply a fluid which includes metal slurry 304 to surface 316 of substrate 312, such as a brush system, or in a gaseous form, which may utilize one or more vacuum infiltration and/or deposition sub-systems.

With concurrent reference to FIGS. 1, 2, 4, and 5, in some examples, during infiltration step 202, interconnected pores 26A-26D of C/C composite substrate 12 may be infiltrated with a fluid that includes one or more metals. Suitable metals include silicon (Si), hafnium (Hf), molybdenum (Mo), tungsten (W), or the like. The fluid may be metal slurry 304 that may include metal particles in an application medium. Metal slurry 304 may include the metal and one or more carrier materials, or may consist essentially of pure metal in a molten state. In some examples, the metal particles may be coated by a thin layer of a metal oxide, such as may be formed in an oxidizing atmosphere during formation or shelf-life of the metal particles. For example, a relatively pure feedstock of metal particles may be prohibitively expensive due to inert storage, such that use of metal particles that include a metal oxide film may broaden available feedstocks of material for the metal particles and/or reduce a cost of the metal particles.

In some examples, application and/or infiltration of the metal by metal application system 302 may be conducted while heating or maintaining the temperature of metal slurry 304 above a threshold temperature for example in furnace 360, which may include heating element 362. In some examples, heating may include melting metal slurry 304 and maintaining metal slurry 304 in a molten state during infiltration step 202. Heating or maintaining the temperature of metal slurry 304 may allow metal slurry 304 to wick by capillary action along fluid path 36A, from first interconnected pore 26A to second interconnected pore 26B, and further along fluid path 36B from second interconnected pore 26B to third interconnected pore 26C, and so on until metal slurry 304 infiltrates and substantially fills interconnected pores 26A-26D of open pore 26. Alternatively, in some examples, the infiltration step may be executed while the metal is in a gaseous state, such as during a chemical vapor infiltration (CVI) process, a chemical vapor deposition process (CVD), or combinations thereof. As such, metal may be applied and infiltrate first phase 14 in any form, including as a liquid or gas. It may be desirable to wick metal slurry to a depth within first phase 14 below surface 16 before reacting metal of metal slurry 304 with carbon of first phase 14, to protect C/C composite substrate 12 more fully, as described above. In some examples, step 202 may include infiltrating metal of metal slurry 304 to a depth below surface 316 of substrate 312. In some examples, the depth may be at least about 300 micrometers, or at least about 500 micrometers, or at least about 1,000 micrometers below the surface of the substrate. In some examples, infiltrating step 202 may include distributing metal slurry 304 with metal application system 302 such that second phase 34 forms substantially evenly throughout the substrate. In some examples, infiltrating step 202 may include applying metal slurry 304 to first surface 16, and wicking metal through the interconnected pores 26A-26D from first surface 16 to second opposite surface 18. In this way, technique 200 may be executed to form article 10 which includes second phase 34 which extends from first surface 16 to second surface 18, along an entire depth of substrate 12.

Technique 200 further includes reacting carbon of first phase 14 with the metal of the infiltrated fluid (e.g., metal slurry 304) with carbon of the C/C composite substrate to form second phase 304 which includes metal carbide within interconnected pores 26A-26D of C/C composite substrate 12 (204). For example, previously described FIG. 2 is a cross-sectional side view diagram illustrating the portion of first phase 14 of C/C composite substrate 12 after infiltration and reaction of metal of metal slurry 304 with carbon of first phase 14 to form second phase 34. Second phase 34 may act as a barrier, blocking oxidizing agents encountered in service from migrating along interconnected pores 26A-26D of C/C composite substrate 12. Thus, second phase 34 may increase the useable life of the component.

In some instances, this reaction may be limited by diffusion of the metal of metal slurry 304 into first phase 14 and carbon of first phase 14 into open pore 26. As the metal reacts with the C/C composite substrate 12 and forms a metal carbide, the newly formed metal carbide may form a diffusion barrier separating the reactants (e.g., carbon and metal), which may stop the thickening and further creation to form thicker metal carbides (e.g., by preventing metal from further penetrating into a depth of the surface portion of C/C composite substrate 12 and/or preventing diffusion of carbon out of C/C composite substrate 12 to react with the metal). For this reason, it may be relatively important to completely or nearly completely perform step 202 before the reaction of carbon and metal to form metal carbide second phase 34 can occur As one example, for a metal of silicon, the temperature may be maintained by furnace 360 at greater than about 1400° C., the pressure may be maintained between about 0.1 mTorr and about 300 mTorr, and the temperature and pressure may be maintained to allow for infiltration of open pores 22, 24, and 26 to the desired depth before the reaction of metal and carbon may occur.

Referring to FIGS. 3 and 4, in some examples the technique of FIG. 4 may further include forming layer 38A on first surface 16 of substrate 12. The technique may further include 38B on second surface 18 of substrate 12. Layers 38 may be formed with any suitable thickness. In some examples, a thickness of coating 38 may be between about 1 micrometer and about 30 micrometers. In some examples, a thickness of layers 38 may be self-terminating and determined by diffusion properties of the metal carbon system.

Figure 6:
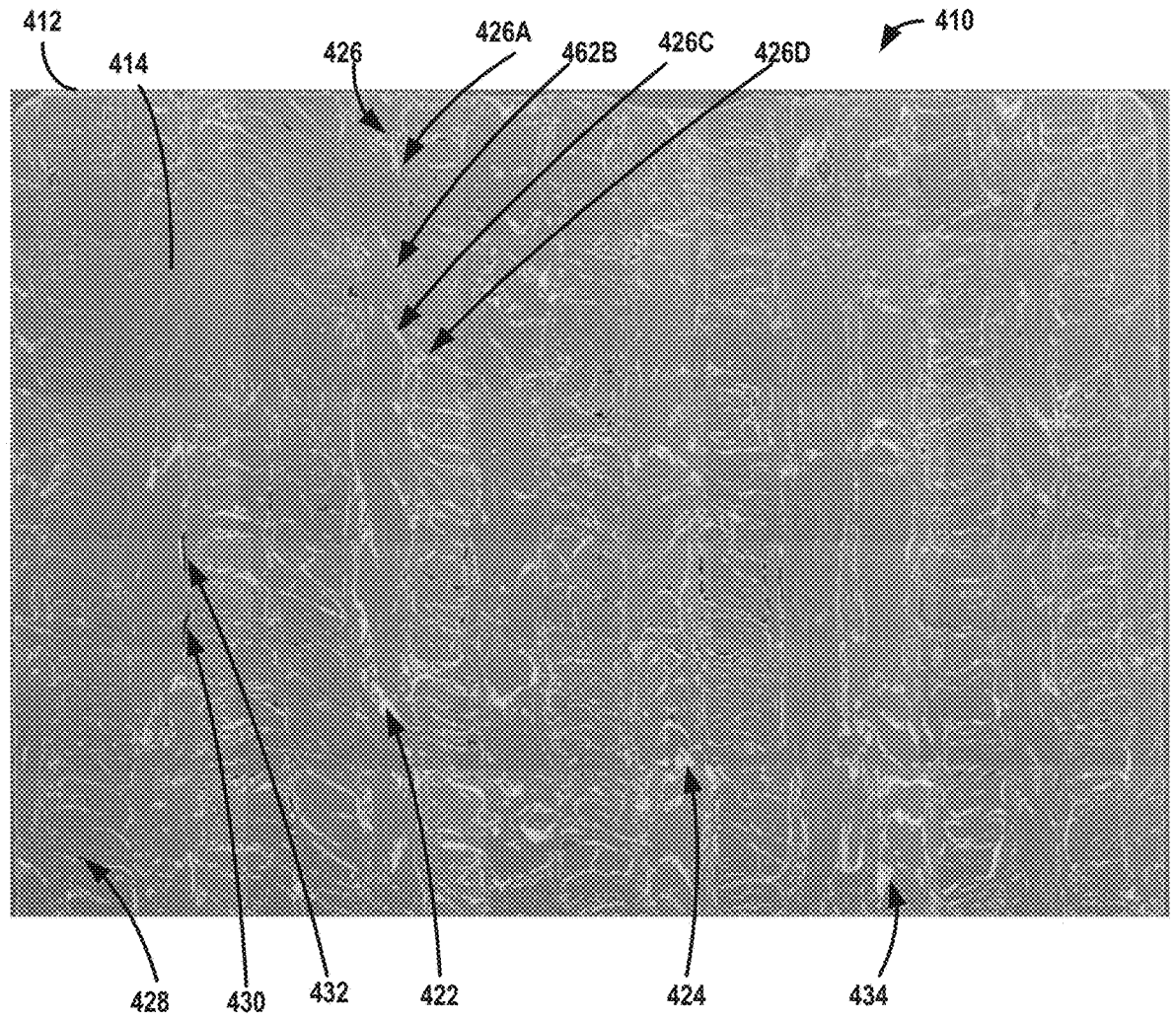
FIG. 6 is a micrograph illustrating an article including a first phase and a second phase disposed within pores of the first phase, according to examples of the present disclosure.

FIG. 6 is a micrograph illustrating article 410. Article 410 may be an example of article 10 of FIGS. 1-3, and may be generally described similarly, where similar reference numbers indicate similar elements. Article 410 includes first phase 414 and second phase 434. Second phase 434 is disposed within interconnected pores 426A. 426B, 426C, and 426D of open pore 426 of first phase 414. Open pore 426 may be a first open pore of a plurality of open pores, and article 410 may further include open pores 422 and 424.

Article 410 further includes closed pores 428, 430, 432. Closed pores 428, 430, 432 are three closed pores of a plurality of closed pores, the total volume of which is less than ten percent of the entire volume of substrate 412. Example article 414 was formed using technique 200 of FIG. 4.

As illustrated, technique 200 to infiltrate first phase 414 to a depth of several centimeters to form article 410. As such, article 410 may provide further oxidation resistance when compared to conventional coated articles and techniques, which cover only a surface layer of a C/C composite component with an antioxidant material.

The following numbered clauses illustrate one or more aspects of the articles and techniques described in this disclosure:

Clause 1: An article includes a substrate includes a first phase comprising a carbon-carbon (C/C) composite; and a second phase comprising a metal carbide; wherein the second phase is disposed within a plurality of interconnected pores of the first phase, and wherein the second phase extends from a surface of the substrate to a depth of at least about 300 micrometers below the surface of the substrate.

Clause 2: The article of clause 1, wherein the interconnected pores of the first phase are open pores that fluidically connect to a surface of the substrate.

Clause 3: The article of clause 2, further comprising a plurality of closed pores that do not fluidically connect to the surface of the substrate, wherein the plurality of closed pores define empty void volumes in the substrate.

Clause 4: The article of clause 3, wherein the plurality of interconnected pores and the plurality of closed pores together define a substrate porosity, and wherein the substrate porosity is less than or equal to about 30 percent of the total volume of the substrate.

Clause 5: The article of any of clauses 3 and 4, wherein a total empty void volume defined by the plurality of closed pores comprises less than or equal to about ten percent of the total volume of the substrate.

Clause 6: The article of any of clauses 1 through 5, wherein the second phase is distributed substantially evenly throughout the first phase along a depth of the substrate.

Clause 7: The article of any of clauses 1 through 6, further comprising a layer of the second phase on a surface of the substrate.

Clause 8: The article of clause 7, wherein the layer is from about 1 micrometer to about 30 micrometers thick.

Clause 9: The article of any of clauses 1 through 8, wherein the metal carbide comprises at least one of silicon carbide, titanium carbide, hafnium carbide, molybdenum carbide, or tungsten carbide.

Clause 10: The article of any of clauses 1 through 9, wherein the surface is a first surface, and the article defines a second surface opposite the first surface, and wherein the second phase extends from the first surface to the second surface.

Clause 11: The article of any of clauses 1 through 10, wherein a first pore of the plurality of interconnected pores of the first phase defines a dimension that is less than about 40 micrometers in one direction, and wherein the second phase substantially fills the first pore.

Clause 12: A method of forming an article includes infiltrating interconnected pores of a substrate with a fluid that comprises a metal, wherein the substrate includes a first phase comprising a carbon-carbon (C/C) composite and plurality of interconnected pores within the first phase; and reacting carbon of the first phase with the metal to form a second phase disposed within the interconnected pores of the first phase, wherein the second phase extends from a surface of the substrate to a depth of at least about 300 micrometers below the surface of the substrate.

Clause 13: The method of clause 12, wherein the plurality of interconnected pores are open pores, and wherein infiltrating the substrate comprises wicking the fluid along the open pores.

Clause 14: The method of clause 13, wherein the substrate further comprises a plurality of closed pores that do not fluidically connect to the open pores.

Clause 15: The method of clause 14, wherein the plurality of interconnected pores and the plurality of closed pores together define a substrate porosity, and wherein the substrate porosity is less than or equal to 30 percent of the total volume of the substrate.

Clause 16: The method of clause 15, wherein a total empty void volume defined by the plurality of closed pores comprises less than or equal to ten percent of the total volume of the substrate.

Clause 17: The method of any of clauses 12 through 16, wherein infiltrating the substrate comprises distributing the fluid such that the second phase is distributed substantially evenly throughout the first phase along a depth of the substrate.

Clause 18: The method of any of clauses 12 through 17, further comprising forming a layer of the second phase on a surface of the substrate.

Clause 19: The method of any of clauses 12 through 18, wherein the metal comprises at least one of silicon, titanium, hafnium, molybdenum, or tungsten.

Clause 20: The method of any of clauses 12 through 19, wherein the surface is a first surface, and the article defines a second surface opposite the first surface, and wherein the second phase extends from the first surface to the second surface.

Various examples have been described. These and other examples are within the scope of the following claims.

What is claimed is:

1. An article comprising:
   a substrate comprising at least two phases, including:
   a first phase comprising a carbon-carbon (C/C) composite having a plurality of interconnected pores with a porosity that is functionally graded in one or more directions; and
   a second phase comprising a metal carbide; wherein:
   the second phase is disposed within the plurality of interconnected pores of the first phase,
   the second phase extends from a surface of the substrate to a depth of at least about 300 micrometers below the surface of the substrate;
   the plurality of the interconnected pores of the first phase comprise first pores and second pores;
   the first pore of the plurality of interconnected pores of the first phase defines a dimension that is less than about 40 micrometers in one direction, and the second phase substantially fills the first pores; and
   the second pore of the plurality of interconnected pores of the first phase defines a dimension that is more than about 40 micrometers in one direction, and the second phase does not substantially fill the second pores; and the second pores are substantially sealed by the second phase.

2. The article of claim 1, wherein the interconnected pores of the first phase are open pores that fluidically connect to a surface of the substrate.

3. The article of claim 2, further comprising a plurality of closed pores that do not fluidically connect to the surface of the substrate, wherein the plurality of closed pores define empty void volumes in the substrate.

4. The article of claim 3, wherein the plurality of interconnected pores and the plurality of closed pores together define a substrate porosity, and wherein the substrate porosity is less than or equal to about 30 percent of a total volume of the substrate.

5. The article of claim 3, wherein a closed pore void volume defined by the plurality of closed pores comprises less than or equal to about ten percent of the total volume of the substrate.

6. The article of claim 1, wherein the second phase is distributed substantially evenly throughout the first phase along a depth of the substrate.

7. The article of claim 1, further comprising a layer of the second phase on a surface of the substrate.

8. The article of claim 7, wherein the layer is from about 1 micrometer to about 30 micrometers thick.

9. The article of claim 1, wherein the metal carbide comprises at least one of silicon carbide, titanium carbide, hafnium carbide, molybdenum carbide, or tungsten carbide.

10. The article of claim 1,
    wherein the surface is a first surface, and the article defines a second surface opposite the first surface, and wherein the second phase extends from the first surface to the second surface.

11. A method of forming an article, the method comprising:

infiltrating interconnected pores of a substrate with a fluid that comprises a metal, wherein the substrate includes a first phase comprising a carbon-carbon (C/C) composite and plurality of interconnected pores within the first phase; and reacting carbon of the first phase with the metal to form a second phase comprising a metal carbide which is disposed within the interconnected pores of the first phase, wherein the second phase extends from a surface of the substrate to a depth of at least about 300 micrometers below the surface of the substrate, wherein:

the C/C composite has the interconnected pores with a porosity that is functionally graded in one or more directions;

the interconnected pores of the first phase include first pores and second pores;

reacting carbon of the first phase with the metal to form the second phase comprises substantially filling the first pores of the plurality of interconnected pores of the first phase with the second phase, wherein the first pore defines a dimension that is less than about 40 micrometers in one direction, and reacting carbon of the first phase with the metal to form the second phase comprises not substantially filling the second pores of the plurality of interconnected pores of the first phase with the second phase, wherein the second pore defines a dimension that is more than about 40 micrometers in one direction; and wherein the second pores are substantially sealed by the second phase.

12. The method of claim 11, wherein the plurality of interconnected pores are open pores, and wherein infiltrating the substrate comprises wicking the fluid along the open pores.

13. The method of claim 12, wherein the substrate further comprises a plurality of closed pores that do not fluidically connect to the open pores.

14. The method of claim 13, wherein the plurality of interconnected pores and the plurality of closed pores together define a substrate porosity, wherein the substrate porosity is less than or equal to 30 percent of a total volume of the substrate.

15. The method of claim 14, wherein a closed pore void volume defined by the plurality of closed pores comprises less than or equal to ten percent of the total volume of the substrate.

16. The method of claim 11, wherein infiltrating the substrate comprises distributing the fluid such that the second phase is distributed substantially evenly throughout the first phase along a depth of the substrate.

17. The method of claim 11, further comprising forming a layer of the second phase on a surface of the substrate.

18. The method of claim 11, wherein the metal comprises at least one of silicon, titanium, hafnium, molybdenum, or tungsten.

19. The method of claim 11, wherein the surface is a first surface, and the article defines a second surface opposite the first surface, and wherein the second phase extends from the first surface to the second surface.

* * * * *